Patented July 28, 1936

2,048,818

UNITED STATES PATENT OFFICE 2,048,818

PROCESS OF PRODUCING EDIBLE FATTY ESTERS OF SYNTHETIC ORIGIN

Harvey D. Royce, Savannah, Ga., assignor to The Southern Cotton Oil Company, New Orleans, La., a corporation of New Jersey No Drawing. Application July 21, 1934, Serial No. 736,439

4 Claims. (Cl. 87—12)

My invention relates to improvements in edible fatty esters and the process of producing the same, and has to do, more particularly, with synthetic, hydrophyllic emulsifying and improving agents which are edible, palatable, digestible and suitable for admixture with margarine, shortening, salad oils and other fatty compositions.

It is my belief that many crude fats and oils contain significant amounts of mono- and di-glycerides of the fatty acids, which impart desirable emulsifying and water-absorptive properties to them, but that such mono- and di-glycerides substantially disappear in the course of the usual refining, bleaching and deodorizing processes to which such crude fats and oils are subjected to render them edible and fit for human consumption. As a consequence, most edible refined fats and oils on the market are deficient in mono- and di-glycerides and such refined products do not absorb water or emulsify readily.

The principal object of my invention, therefore, is to provide synthetic mono- and di-glycerides of the fatty acids of an edible, palatable and digestible character, which may be added to margarine, shortening, salad oils and other edible fatty compositions to improve the emulsifying and water-absorptive properties thereof.

A further object of my invention is to provide an improved process for the production of mono- and di-glycerides of the fatty acids of such a nature that the resultant product is edible, palatable and digestible.

Still a further object of my invention is to provide an improved method of refining the crude, synthetic, fatty esters, such as the mono- and di-glycerides of the fatty acids, so that the inedible, unpalatable and ill-smelling crude material is rendered edible and fit for human consumption.

Further objects, and objects relating to details and economies of operation, will definitely appear from the detailed description to follow. In general, I accomplish the objects of my invention by the means described in the following specification. My invention is clearly defined and pointed out in the appended claims.

My invention has to do with the manufacture or synthetic preparation of edible mono- and di-glycerides of the fatty acids and, in general, is concerned with a process for the production of edible, fatty acid esters of polyhydric alcohols which contain one or more unesterified (OH) groups, corresponding to the general formula:

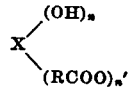

in which H, O and C have their usual chemical significance, "RCOO" is a higher fatty acid radical, and "X" is a polyhydric alcohol radical, and "$n$" and "$n'$" are small whole numbers. Thus, "X" may be the glyceryl ($C_3H_5$), diglycol ($C_4H_8O$), or other like radical of an aliphatic polyhydric compound.

In general, my invention consists in a process for producing fatty esters including refining steps by which the crude, inedible, incompletely esterified fatty acid esters of polyhydric alcohols are converted into edible products of good color, flavor and odor. The crude esters may be produced or prepared by any of the well-known methods, for instance, (a) by heating together fatty acids and polyhydric alcohols, with or without catalysts, or (b) by heating fully esterified fatty acid esters of polyhydric alcohols with polyhydric alcohols, with or without catalysts. The crude esters thus prepared contain acrid and ill-smelling impurities which render them inedible and unfit for addition to edible products in any considerable amount. Furthermore, basic catalysts such as lime, soda, zinc oxide or magnesia, are commonly used in producing these crude esters and they should be removed in the preparation of an edible product.

The refining operation of my invention comprises, in general, the purification of these crude esters by agitation with small amounts of concentrated phosphoric acid, or acid salts of phosphoric acid, at elevated temperatures. I prefer to employ 0.1 to 2.0 percent of syrupy phosphoric acid (85%), at temperatures ranging from 50° C. to 110° C. and which should not exceed 180° C. The acid is added slowly to the crude ester while maintaining a thorough agitation and, after the addition of acid is complete, the spent acid and the impurities are allowed to settle out. Centrifuging and filtration may be employed to assist in the removal of the precipitated acid sludge.

If basic catalysts have been used in the preparation of the crude ester, it is essential to use sufficient phosphoric acid to neutralize the base and render the mix distinctly acidic in reaction, corresponding to a strength of 0.1 percent H₃PO₄ or more. Pyrophosphoric, metaphosphoric, or ethylphosphoric acid may be employed in lieu of orthophosphoric acid in carrying out my invention, and the acid salts of phosphoric acid, such as mono-sodium phosphate, may be used either alone, or in admixture with phosphoric acid. My experiments have shown that any of the above-mentioned substances will give desirable results when used in accordance with my invention.

The following is a specific example of procedure which I have found most desirable for the production of edible fatty esters in accordance with my invention: 100 parts of refined cotton-seed oil were heated to 250° C. for two hours in a stream of hydrogen with 20 parts of glycerol and 0.5 part of sodium carbonate. At the end of this time the glycerol layer was completely absorbed in the oil and the acetyl number of the crude mono- and di-glyceride was 160. After cooling the mixture to 85° C. in a current of hydrogen, 100 parts of the mixture were agitated vigorously for two minutes with 1 part of 85% H₃PO₄. In a few minutes, a definite "break" was observable and, after standing for fourteen hours at 50° C., the clear refined glycerides were decanted from the fat-insoluble acid foots, with a loss of only 3%. The refined product thus decanted which I believe consisted largely of mono-glyceride, with some di-glyceride therein, had a light color (24 yellow, 2.0 red, Lovibond), a good flavor and an acetyl number of 145. Further purification and improvement in flavor, to prepare the refined product for admixture with delicately flavored products, such as salad oils, was readily effected by vacuum steam deodorization. The refined product, prepared as described above, was soluble in fats, edible, palatable, digestible and entirely acceptable as an article of diet, either alone or in admixture with fats, oils or fatty foods.

The refining treatment conducted in accordance with my invention is exceedingly useful in converting crude, synthetic, hydrophyllic fatty esters, of an inedible and unpalatable character, into palatable, edible and digestible fatty esters which are useful for improving natural fats, oils and fatty foods, with respect to their emulsifying and water-holding properties. Shortenings or salad oils are much improved by the admixture therewith of a small percentage of this refined mono-glyceride concentrate.

I am aware that my process is susceptible of considerable variation, without departing from the spirit of the invention, and, therefore, I claim my invention broadly, as indicated by the appended claims.

What I claim is:

1. The process of producing edible fatty esters comprising the reacting of cotton-seed oil and glycerol in the proportion of about five parts of oil to one of glycerol, adding to the mixture from 0.1 to 2.0 percent of concentrated phosphoric acid, and separating the clear supernatant liquid from the acid foots which settle therefrom.

2. The process of producing edible fatty esters comprising the reacting of cotton-seed oil and glycerol in substantially the proportion of five parts of oil to one of glycerol, cooling the mixture, adding from 0.1 to 2.0 percent of concentrated phosphoric acid, agitating the mixture, and separating the clear supernatant liquid from the acid foots which settle therefrom.

3. The process of producing edible fatty esters comprising the reacting of 100 parts of cotton-seed oil and 20 parts of glycerol at a temperature of about 250° C. in a stream of hydrogen and the presence of a basic catalyst, cooling the mixture to about 85° C. in the presence of hydrogen, adding one part of concentrated phosphoric acid to each 100 parts of the mixture, agitating the mixture, permitting the mixture to settle, and separating the clear supernatant liquid from the acid foots which settle therefrom.

4. The process of refining inedible, synthetic, hydrophyllic fatty esters of polyhydric alcohols comprising the admixture therewith of from 0.1 to 2.0 percent of a concentrated phosphoric acid or an acid phosphate, agitating the mixture at a temperature not exceeding 180° C., and separating the supernatant liquid from the fat-insoluble acid foots.

HARVEY D. ROYCE.